United States Patent [19]

Yates et al.

[11] 4,238,539

[45] Dec. 9, 1980

[54] FIBER REINFORCED COMPOSITE SHAFT WITH METALLIC CONNECTOR SLEEVES MOUNTED BY A KNURL INTERLOCK

[75] Inventors: Derek N. Yates, Los Gatos; John C. Presta, San Jose, both of Calif.

[73] Assignee: Celanese Corporation, New York, N.Y.

[21] Appl. No.: 43,553

[22] Filed: May 29, 1979

[51] Int. Cl.³ .......................... B32B 5/12; F16C 1/02
[52] U.S. Cl. ........................................ 428/36; 64/1 R; 64/1 S; 156/172; 156/173; 156/175; 156/189; 428/367
[58] Field of Search ............... 156/172, 189, 173, 175; 273/80 R; 64/1 S, 1 R, 2 R, 16, 27 R; 428/36, 367; 285/91; 138/130–132, 144, DIG. 2

[56] References Cited

U.S. PATENT DOCUMENTS

| | | | |
|---|---|---|---|
| 2,882,072 | 4/1959 | Noland | 138/138 |
| 3,592,884 | 7/1971 | Williams | 64/1 R |
| 3,661,670 | 5/1972 | Pierpont, Jr. | 156/172 |
| 4,041,599 | 8/1977 | Smith | 29/451 |
| 4,089,190 | 5/1978 | Worgan et al. | 64/1 R |
| 4,097,626 | 6/1978 | Tennent | 428/36 |

FOREIGN PATENT DOCUMENTS 1356393  6/1974  United Kingdom ............... 156/189

*Primary Examiner*—William J. Van Balen
*Attorney, Agent, or Firm*—Kenneth A. Genoni

[57] ABSTRACT

A tubular fiber reinforced composite shaft is formed (as described) which integrally incorporates a metal sleeve or connection at the end thereof. Initially a metal sleeve having knurls on its outer surface is positioned upon a segment of a mandrel. Fibrous material bearing a non-solidified resinous material is applied around the mandrel and around the knurls and is locked between spaced knurl projections. Additional fibrous material bearing the non-solidified resinous material is applied to the previously applied material. The resinous material next is solidified to form a tubular composite shaft whereby a secure torsion-transmitting connection is made with the sleeve, and the mandrel is removed. Alternatively, an outer sleeve can be inserted after the additional fibrous material has been applied to the first-named sleeve. The outer sleeve has knurls on an inner surface thereof and is pressed against the fibrous material as by swagging. Outer ends of the inner and outer sleeves are welded together after the resinous material is solidified.

8 Claims, 6 Drawing Figures

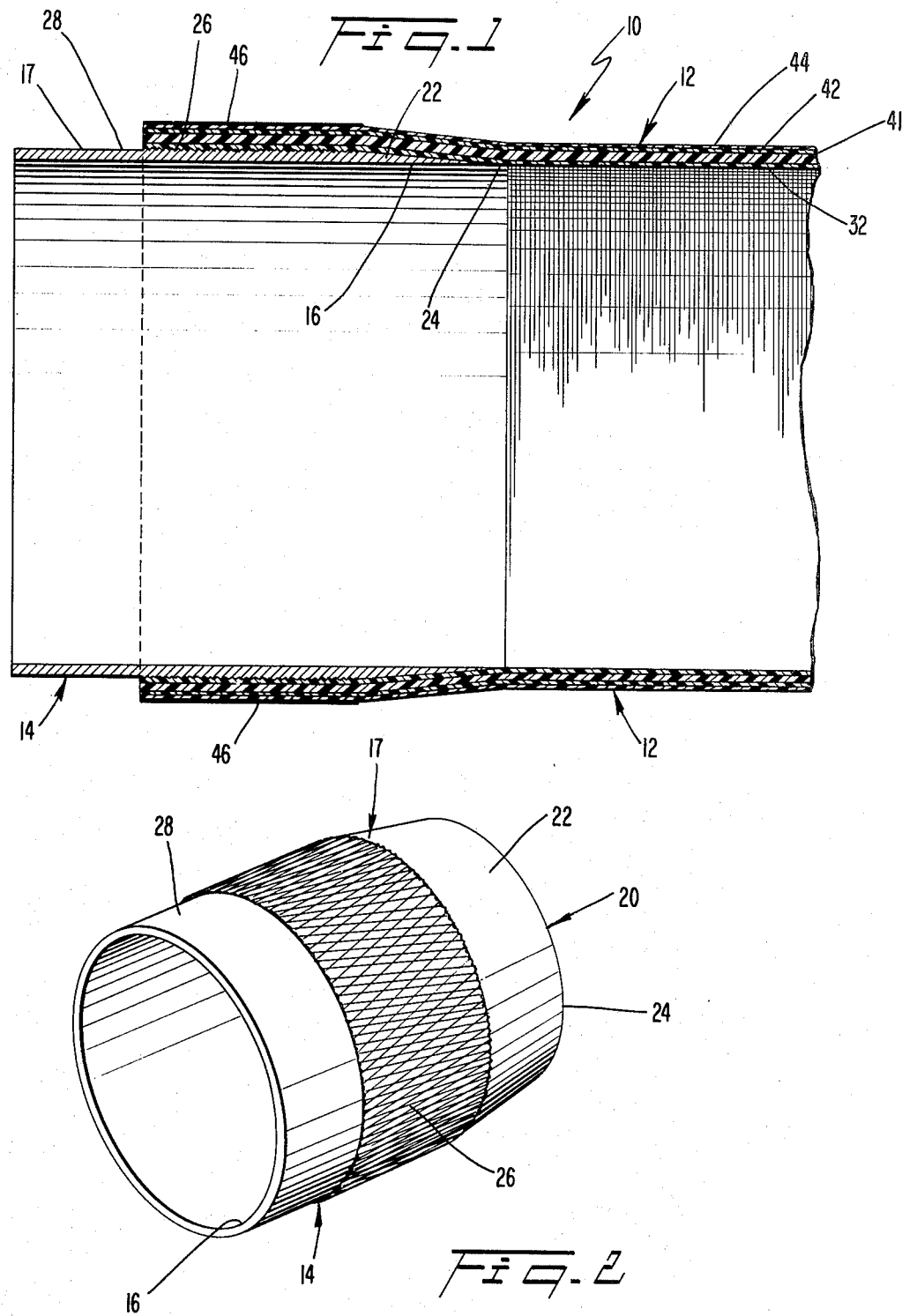

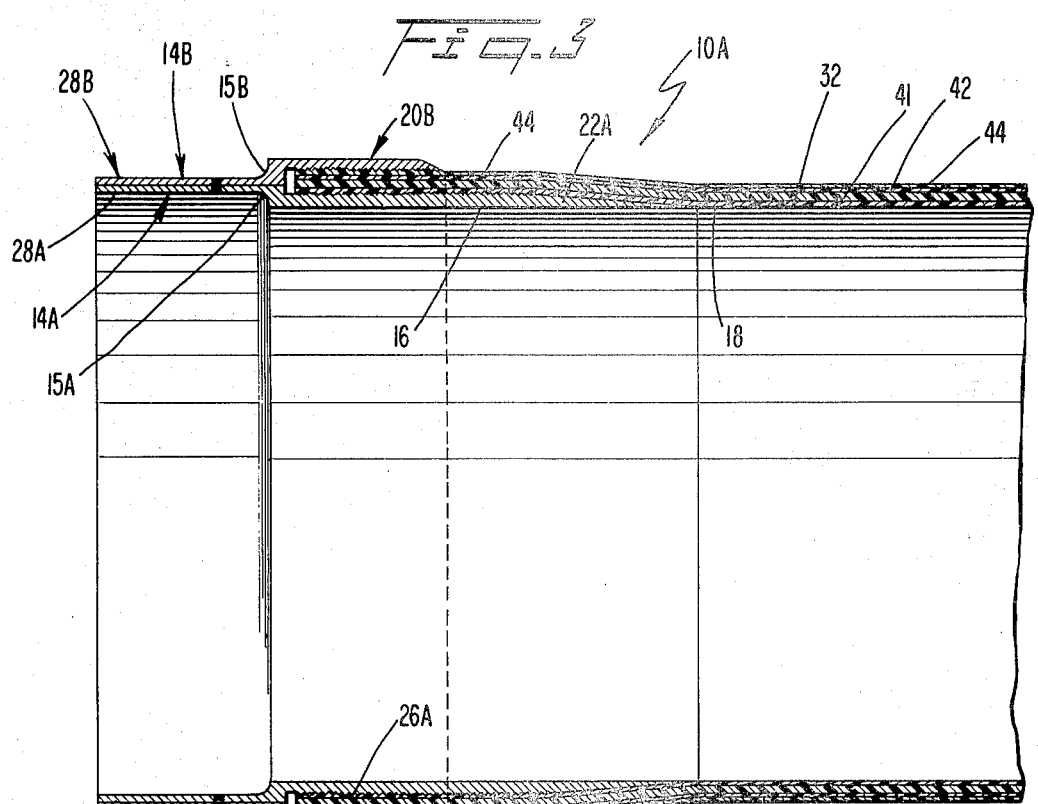
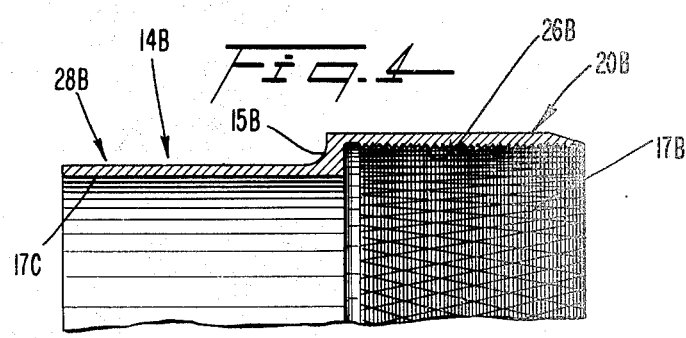
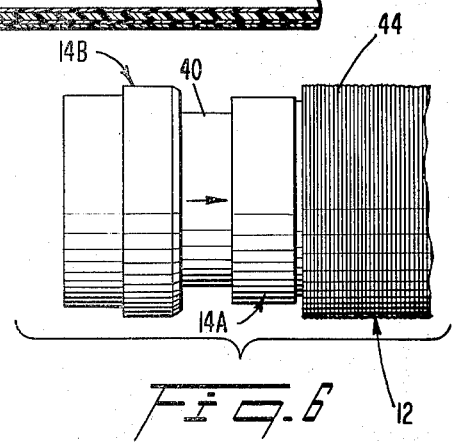
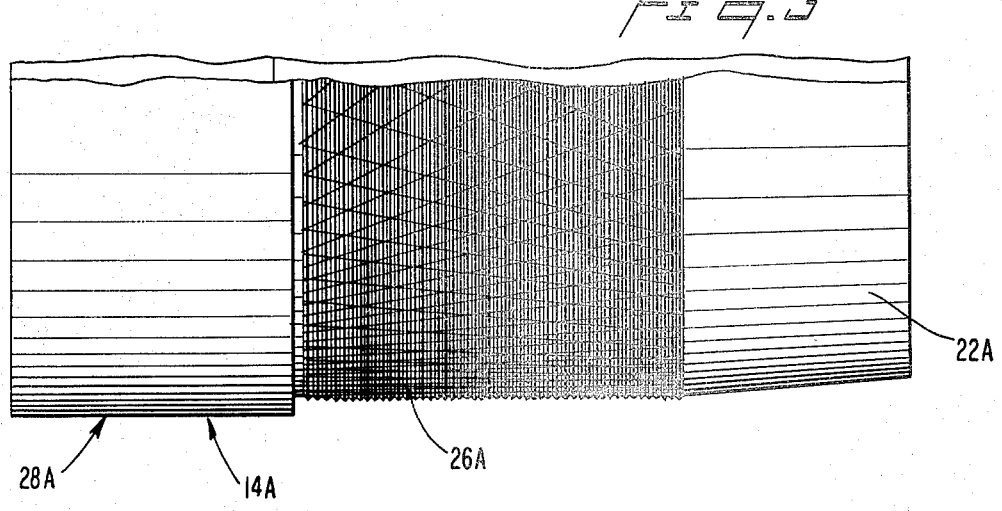

FIBER REINFORCED COMPOSITE SHAFT WITH METALLIC CONNECTOR SLEEVES MOUNTED BY A KNURL INTERLOCK

BACKGROUND AND OBJECTS OF THE INVENTION

This invention relates to fiber reinforced composite shafts and, more especially, to vehicle drive shafts comprising a fiber reinforced resinous shaft body with metallic coupling sleeves mounted at the ends thereof.

Tubular fiber reinforced composites have been heretofore proposed, as demonstrated by U.S. Pat. Nos. 2,882,072 issued to Noland on Apr. 14, 1959, and 3,661,670 issued to Pierpont on May 9, 1972, and in British Pat. No. 1,356,393 issued on June 12, 1974. In the Pierpont patent, for example, it has been proposed to form such composites from a resinous material which is reinforced by glass fibers. In particular, filaments bearing a non-hardened resinous material (i.e., an uncured thermosetting resin) are wound around a mandrel until the desired thickness has been established. The reinforcing fibers can be positioned within the wall of the tubular composite in varying angular relationships. Thereafter, the resinous material is solidified (i.e. is cured). A premolded threaded end portion can be mounted at the ends of the tubular composite, such as by the winding of filaments directly around the end portion during the winding process.

It recently has been proposed to form vehicle drive shafts from tubular fiber reinforced composites, as demonstrated by U.S. Pat. No. 4,041,599 issued to Smith on Aug. 16, 1977, and published Japanese Application No. 52-127542, entitled "Carbon Fiber Drive Shaft" which claims priority for the filing of U.S. Ser. No. 676,856 on Apr. 14, 1976 of Gordon Peter Worgan et al (now U.S. Pat. No. 4,089,190). In the Japanese application filaments bearing a non-hardened resinous material (e.g., an uncured thermosetting resin) are wound around a mandrel until the desired thickness has been established, whereupon the resinous material is cured. Zones or layers are positioned circumferentially within the wall of the shaft in the specific angular relationships there disclosed.

The above-mentioned Smith patent proposes the attachment of a carbon fiber reinforced epoxy drive shaft directly to a universal joint extension by a specific bonding technique.

Fiber reinforced composite shafts exhibit advantages over metallic shafts, i.e., they are lighter in weight, more resistant to corrosion, stronger, and more inert.

In copending application Ser. No. 890,232 filed Mar. 27, 1978, of Derek N. Yates and David B. Rezin now U.S. Pat. No. 4,171,626 entitled "Improved Carbon Fiber Reinforced Composite Drive Shaft," a fiber reinforced composite drive shaft is disclosed which exhibits improved service characteristics and the necessary strength and durability to withstand the various stresses encountered during vehicle operation. The disclosure of that copending application is herein incorporated by reference as if set forth at length.

Since direct welding or bonding of a resin shaft to metal does not normally create a sufficiently strong and durable connection on a consistent and reliable basis, the use of metallic connector sleeves mounted at the ends of the shaft in accordance with the concept of the present invention provides a means for accomplishing a secure welded connection similar to that utilized with conventional metallic shafts.

The high torque loads which are to be transmitted by a vehicle drive shaft require that an extremely strong and durable torsional drive connection be established between the sleeves and shaft body. Previous proposals for mounting sleeves by employing adhesives or by wrapping the filament bundles around circumferential grooves on the sleeve periphery, cannot be relied upon to provide a connection of the requisite strength and durability.

It is, therefore, an object of the present invention to provide a novel, fiber reinforced resin shaft which minimizes or obviates problems of the types discussed above.

It is an additional object of the invention to provide a novel, fiber reinforced resin shaft suitable for use as a drive shaft in a vehicle power train.

It is a further object of the invention to provide novel methods and apparatus for securing metal connector sleeves to the ends of fiber reinforced resin shafts to enable the shafts to transmit high torsional loads.

BRIEF SUMMARY OF THE INVENTION

These objects of the present invention are achieved by a tubular fiber reinforced composite shaft, and a method for making same wherein a tubular sleeve is provided circumferentially spaced, longitudinally staggered knurls disposed around at least a portion of its outer periphery. Fibrous material bearing a non-solidified resinous material is applied to the mandrel and the knurls of the sleeve such that portions of the fibrous material become interlocked between spaced knurl projections. The resinous material is solidified with portions of the applied fibrous material being in interlocked relation with the knurl projections, to form a torsion-transmitting connection therebetween. Thereafter the mandrel is removed.

THE DRAWING

Other objects and advantages of the present invention will become apparent from the subsequent detailed description of a preferred embodiment thereof in connection with the accompanying drawings in which like numerals designate like elements and in which:

FIG. 1 is a longitudinal sectional view through a composite shaft according to the present invention;

FIG. 2 is a perspective view of a metal sleeve which is mounted to a composite shaft body;

FIG. 3 is a longitudinal sectional view through an alternate preferred embodiment of the composite shaft;

FIG. 4 is a partial longitudinal sectional view through an outer sleeve section to be mounted to the composite shaft body;

FIG. 5 is a partial side elevational view of an inner sleeve section which is to be mounted to the composite shaft body; and FIG. 6 is a side elevational view depicting the insertion of the outer sleeve section onto the inner sleeve section and onto fibrous material having previously been applied thereto.

DETAILED DESCRIPTION OF PREFERRED EMBODIMENTS OF THE INVENTION

A drive shaft 10 according to the present invention comprises a reinforced resin shaft body 12 of cylindrical cross-section, and a metal connector sleeve 14 secured preferably at each end of the shaft body.

The connector sleeve 14 is generally cylindrical and formed of an appropriate metal, such as steel or aluminum for example. The sleeve includes radially inner and outer annular surfaces 16, 17. The surface 16 is of constant diameter and is substantially contiguous with an inner surface 18 of the shaft body located longitudinally inwardly thereof, as is evident from FIG. 1.

The longitudinally inner end 20 of the outer surface 17 of the sleeve 14 includes a portion 22 tapered in a direction extending longitudinally and radially inwardly to provide a feather edge 24 for the reception of windings of reinforced resin material as will be discussed.

An intermediate portion 26 of the outer surface 17 is knurled so as to present a large number of longitudinally and circumferentially spaced minute teeth or projections. The teeth are longitudinally staggered such that between two adjacent and circumferentially aligned teeth there are disposed teeth which are offset therefrom in a longitudinal direction. The radial depth of the knurls is slight, preferably less than the thickness of an initial layer of fibers to be applied to the sleeve. A longitudinally outer end 28 of the outer surface 17 is essentially smooth.

During fabrication of a preferred form of the shaft 10, a pair of connector sleeves 14 are positioned on a mandrel 30 in a longitudinally spaced relationship. The sleeves engage the mandrel 30 somewhat snugly, but loosely enough to be removable therefrom. An appropriate clamping arrangement holds the sleeves 14 in place. The mandrel is coated with a release substance to resist the adherence thereto of resin or adhesives. Thereafter, the shaft body 12 is formed around both the mandrel and sleeve.

Construction of the shaft body 12 is preferably performed in a manner more fully described in the aforementioned application of Yates and Rezin. Summarized briefly, layers of fiber reinforced resin-impregnated material are applied, preferably in the form of bundles of substantially parallel continuous filaments bearing a non-solidified (i.e., liquid, soft and tacky, or molten) resinous material. The bundles can be dipped in an uncured liquid thermosetting resin, such as an epoxy resin, and then wound around the mandrel in multiple passes until a layer of desired thickness is established. Attention is further directed to U.S. Pat. Nos. 3,661,670, 3,202,560, and 3,231,442 for additional details concerning possible arrangements for the clamping of sleeves and winding of filament bundles. The disclosures of these patents are incorporated herein by reference as if set forth at length.

The term "layer" as used herein specifies a circumferential zone within the wall of the tubular drive shaft wherein the fibrous reinforcement is disposed in a specific configuration and differs from the adjacent zone(s) with respect to the configuration and/or composition of the fibrous reinforcement. A single layer may include a multiple pass alignment or buildup of fibrous reinforcement in a given configuration. The term layer encompasses an alignment wherein the fibrous reinforcement is disposed therein at both plus and minus a given angle which optionally can be built-up in multiple passes.

The fibers reinforce the thermoset resin matrix to impart necessary properties of strength and durability to the shaft. In this regard, glass fibers (e.g., E-glass or S-glass) and carbon fibers (i.e., either amorphous or graphitic) materials are preferred. The carbon fibers commonly contain at least 90 percent carbon by weight, and preferably at least 95 percent carbon by weight. Additionally preferred carbon fibers have a Young's modulus of elasticity of at least 25 million psi (e.g., approximately 30 to 60 million psi).

The plies of filament bundles are wound in various orientation relative to the longitudinal axis of the drive shaft, and can be built-up to different thicknesses, respectively. Preferably, an initial layer of glass fibers is applied at an angle of from ±30° to ±50° relative to a line parallel to the longitudinal axis of the shaft. Next, a layer of glass fibers is applied at an angle of from 0° to ±15°. Thereafter, a layer of carbon fibers is applied at an angle of from 0° to ±15°. Then a layer of glass fibers is applied at about an angle of from about ±60° to 90°.

Of course the number and composition of layers, as well as their orientation and thickness may vary, depending upon the characteristics desired to be imparted to the shaft.

Rather than utilizing filament winding (e.g., wet winding or prepreg winding), other tube forming procedures can be employed, such as tube rolling, tape wrapping, or pultrusion, for example. In the former step, comparatively wide sections of resin impregnated tape are precut to patterns, stacked in sequence, and rolled onto the mandrel.

After the layers have been applied, the non-solidified resin is cured. In this regard, the resin may be of a self-curing type, or may be of a kind which cures in response to being subjected to heat and/or curing agent.

Relating more particularly to the present invention, the sleeve(s) 14, is positioned on a segment of a mandrel 40 (FIG. 6). Thereafter, an initial layer 32 of glass fibers is wound around the mandrel and sleeves at about a ±45 degre angle. The fibrous material is wound tightly around the knurls 26 to cover the latter and create a tight engagement therebetween. As the fibers are wound around the knurls, they are captured between circumferentially spaced knurl projections and between longitudinally spaced knurl projections, that is, they become seated within valleys defined by such spaced projections of the knurling. This relationship forms a mechanical interlock between the trapped fibers and the sleeve to prevent longitudinal as well as circumferential movement of the sleeve relative to the fibers.

Thereafter, a layer 41 of glass fibers is wound around the layer 32 at about a zero degree angle. This serves to further secure fibers of the first layer 32 in the aforedescribed mechanical interlocking relationship with the knurls.

Next, a layer 42 of carbon fibers is wound around the layer 41 at about a zero degree angle.

Finally, a layer 44 of glass fibers is wound at about a 90 degree angle around the layer 42.

It will be understood that any number of layers can be applied and at various angles and thicknesses, depending upon desired shaft characteristics.

Thereafter, the non-solidified resin is cured to bond the layers together to form an integral composite, and the shaft is removed from the mandrel.

It will be appreciated that the above-described winding technique serves to mechanically lock the shaft body 12 and sleeve 14 together. The seating of fibers of the initially applied layer between circumferentially spaced knurl projections and longitudinally spaced knurl projections establishes a mechanical interlock which is strong enough to enable high torque loadings to be transmitted between the sleeve and the shaft body as well as to prevent longitudinal dislodgement of the sleeve. The fibers are permanently secured in their interlocking relationship with the knurls by the additional fibers which are applied therearound.

The sleeves 14 facilitate connection of the shaft to metal components such as metal yokes in a vehicle power train, since direct metal-to-metal welding contact is possible.

Although not necessary, it may be desirable to apply an adhesive between the sleeve 14 and the initial layer 32 of fibrous material to augment the connection therebetween.

Although the mechanical lock concept of the present invention is disclosed in conjunction with a particular shaft body, it is to be understood that this concept has utility with composite shafts in general wherein fibrous reinforcement is present in a resinous matrix material.

In an alternative embodiment of the present invention, depicted in FIGS. 3 to 6, a sleeve comprises an outer sleeve section 14B and an inner sleeve section 14A. The inner sleeve section is essentially the same as the sleeve 14 described earlier in connection with the embodiment of FIGS. 1-2, except for the presence of a radially outwardly stepped portion 15A at the longitudinally outer end 28A of the sleeve. The inner sleeve section 14A includes knurls 26A and a tapered portion 22A.

The outer sleeve section 14B includes longitudinally inward peripheral surface 17B on the interior of the sleeve which contains knurls 26B. The outer sleeve section 14B includes a radially inwardly stepped portion 15B and a longitudinally outward end 28B whose inner peripheral surface 17C is of a slightly greater diameter than the outer periphery 17D of the corresponding portion 28A of the inner sleeve section 14A.

The diameter of the longitudinally inward peripheral surface 17B is dimensioned so as to be slightly greater than the outer diameter of the outermost layer 44 of fibrous material. In this fashion, the outer sleeve section 14B can be slipped telescopingly over the inner sleeve section 14A prior to the solidification of the resinous material, as depicted in FIG. 6. Accordingly, the knurled portion 26B of the outer sleeve section overlies the outermost fibrous material 44. By means of a conventional swaging operation, the longitudinally inner end 20B of the outer sleeve section is crimped or deformed inwardly so that the knurls 26B thereof are pressed firmly against the outermost fibrous material 44, to create an interlock between the outer sleeve section 14B and the shaft body 12.

Following that step, the resinous material is solidified. Thereafter, the sleeve sections are secured together, preferably by welding together the longitudinally outward portions 28A, 28B, which are arranged in telescoping fashion.

An axially outer portion 28 of the sleeve 14 is exposed, preferably by removing portions of the layers.

The presence of the outer sleeve segment 14B intensifies the mechanical interlock between the shaft body 12 and the sleeve 14A, B. In this regard, the circumferentially and longitudinally spaced projections of the outer knurls are interlocked with the outermost fibrous material 44 in a manner similar to the knurls of the inner sleeve, and the swagged outer sleeve section further presses the inner fibrous material 32 and the inner knurls 26A together.

It may be desirable to apply adhesive between the knurls 26B of the outer sleeve section and the outermost fibrous material 44 to enhance the connection therebetween.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method of forming a tubular fiber reinforced composite drive shaft comprising the steps of:
    positioning on a segment of a mandrel a tubular inner sleeve having circumferentially spaced, longitudinally staggered knurls disposed around at least a portion of its outer periphery, applying fibrous material bearing non-solidified resinous material upon said mandrel and said knurls of said sleeve such that portions of said fibrous material become interlocked between spaced knurl projections,
    positioning a tubular outer sleeve upon said applied fibrous material such that circumferentially spaced, longitudinally staggered knurls on an internal periphery of said outer sleeve overlie said applied fibrous material,
    deforming the knurl-carrying portion of said outer sleeve inwardly to press the knurls thereof against said applied fibrous material to create an interlock therebetween,
    solidifying said resinous material to create a torsion-transmitting relationship between said inner and outer sleeves and said fibrous material, and
    removing said mandrel.

2. A method according to claim 1, wherein the applying of fibrous material terminates at such location that a longitudinally outer end of said sleeve is exposed.

3. A method according to claim 2, wherein the longitudinally inner end of said sleeve tapers longitudinally and radially inwardly to provide a feather edge for fibrous material being applied.

4. A method according to claim 1, wherein said previously applied fibrous material is applied at an acute angle relative to the longitudinal direction.

5. A method according to claim 1, wherein the said previously applied fibrous material is applied at an angle of ±45 degrees relative to the longitudinal direction.

6. A method according to claim 1, wherein the applying of fibrous material terminates at such location that a longitudinally outer end portion of said inner sleeve section is exposed, said outer sleeve section being positioned such that a longitudinally outer end portion thereof encompasses said exposed end of said inner sleeve portion in telescoping relationship, and further including the step of securing said telescoped end portions subsequent to said solidifying step.

7. A hollow tubular fiber reinforced composite drive shaft comprising:
    a shaft body comprising a plurality of integrally bonded plies of solidified fiber reinforced resinous material;
    an inner metal sleeve section mounted in at least one end of said shaft body, said inner sleeve section including an outer periphery having knurling thereon, with inner fibers of said fibrous material being seated between circumferentially spaced and longitudinally staggered knurl projections, creating a torsion-transmitting connection between said shaft body and said inner sleeve section;

an outer metal sleeve section mounted over said shaft body said outer sleeve section including an inner periphery having knurling thereon, said inner periphery being deformed against said shaft body such that outer fibers of said fibrous material are seated between circumferentially spaced and longitudinally staggered knurl projections, creating a torsion-transmitting connection between said shaft body and said outer sleeve section.

8. Apparatus according to claim 7, wherein said inner and outer sleeve sections each include a longitudinally outward portion extending beyond an end of said shaft body, and means fixedly securing said longitudinally outward portions of said sleeves together.

* * * * *